United States Patent Office.

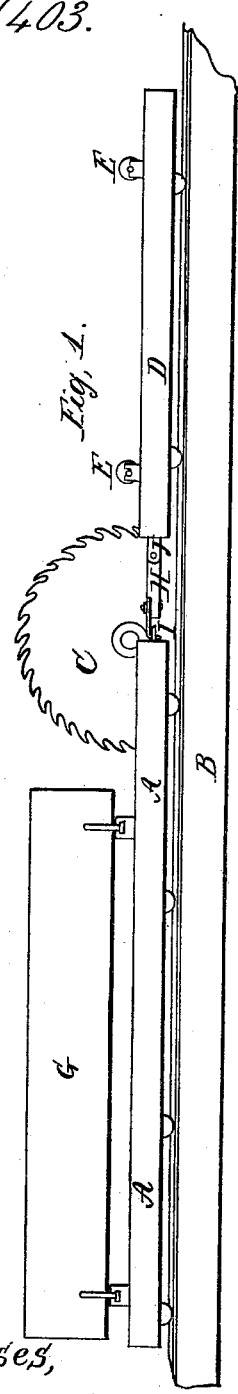
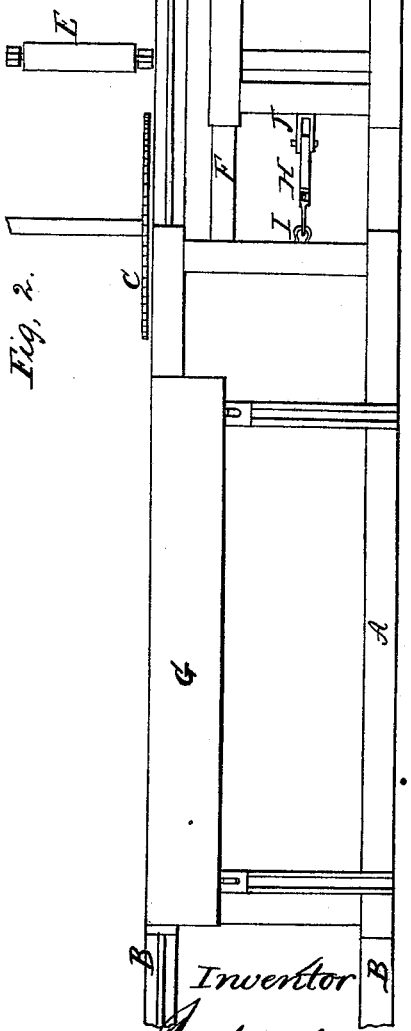

JOHN H. ADAMS, OF MARTINSVILLE, INDIANA.

Letters Patent No. 91,403, dated June 15, 1869.

---

IMPROVEMENT IN DEVICE FOR CARRYING LUMBER FROM THE SAW IN CIRCULAR-SAW MILLS.

---

The Schedule referred to in these Letters Patent and making part of the same.

---

To all whom it may concern:

Be it known that I, JOHN H. ADAMS, of Martinsville, in the county of Morgan, and State of Indiana, have invented new and useful Improvements in Mode of Off-Bearing Lumber from Saw-Mills; and I do hereby declare that the following is a full, clear, and exact description thereof, which will enable skilled artisans to make and use the same, reference being had to the accompanying drawing, and to the letters of reference marked thereon, making part of this specification.

This invention relates to mode of off-bearing or conveying lumber out of the way, as it is cut from the log in saw-mills; and It consists in attaching a truck or car to the forward end of the log-carriage, and that runs upon the same track with it, or upon a supplementary track, laid within or alongside of the track of the log-carriage, and which is brought to the carriage, at each backward movement, into proper position for the lumber to be conveniently removed thereto from the receiving-rollers, and by which it may be thence readily conveyed to the yard without further handling, thus greatly lessening the labor, and saving much of the expense usually required for this purpose.

Figure 1 is a side elevation of an ordinary circular-saw mill, showing the log-carriage and the off-bearing truck attached thereto.

Figure 2 is a top view of the same.

Similar letters of reference indicate corresponding parts in the several figures.

A is the log-carriage, and

B B', the carriage-track.

C, the saw.

G, log.

E E, rollers that receive the boards, &c., as they are cut from the log.

D is the off-bearing truck, which may be made in any known manner.

The truck is here shown as made narrower than the log-carriage, and a supplementary rail, F, is laid for the trucks on the saw-side to run upon, while the trucks on the other side run upon the outside rail B'.

The object of this arrangement is to provide space between the off-bearing truck and the receiving-rollers E, for the workman who removes the lumber therefrom to the car or truck D, and also to avoid the expense of a wide track, extending into the yard.

The truck D may, however, be made the same width as the log-carriage, if desired, and run upon the same track with it.

The car D is attached to the forward end of the log-carriage by a hook, H, pivoted in jaws J, and engaging with an eye, I, in the log-carriage, and is brought by the carriage, when the latter is gigged back, opposite the receiving-rollers E, into convenient position to receive the lumber from the rollers E.

The car is pushed forward along the track B' F, out of the way, as the carriage is fed forward, and returned opposite the rollers as it is backed, this operation being repeated each time a board is cut from the log.

When the car D is loaded, it is unhooked from the log-carriage, and run out into the yard.

Having thus fully described my invention,

What I claim as new, and desire to secure by Letters Patent, is—

Attaching the off-bearing truck or car D to the forward end of the log-carriage, and operating the same in the manner substantially as herein described.

JOHN H. ADAMS.

Witnesses:
O. F. MAYHEW,
J. MORRISON.